(12) United States Patent
Heckendorn et al.

(10) Patent No.: US 11,828,207 B2
(45) Date of Patent: Nov. 28, 2023

(54) INTERNAL COMBUSTION ENGINE WITH AT LEAST ONE HOLLOW-HEAD VALVE

(71) Applicant: Mahle International GmbH, Stuttgart (DE)

(72) Inventors: Heiko Heckendorn, Schopfheim (DE); Christoph Luven, Stuttgart (DE); Alexander Mueller, Wildberg (DE); Alexander Puck, Esslingen (DE)

(73) Assignee: Mahle International GmbH

( * ) Notice: Subject to any disclaimer, the term of this patent is extended or adjusted under 35 U.S.C. 154(b) by 634 days.

(21) Appl. No.: 16/486,620

(22) PCT Filed: Jan. 25, 2018

(86) PCT No.: PCT/EP2018/051849
§ 371 (c)(1),
(2) Date: Aug. 16, 2019

(87) PCT Pub. No.: WO2018/149610
PCT Pub. Date: Aug. 23, 2018

(65) Prior Publication Data
US 2020/0232354 A1 Jul. 23, 2020

(30) Foreign Application Priority Data

Feb. 17, 2017 (DE) .......................... 102017202585.9

(51) Int. Cl.
*F01L 3/14* (2006.01)
*F01L 3/04* (2006.01)
(Continued)

(52) U.S. Cl.
CPC .................................... *F01L 3/14* (2013.01);
*F01L 3/02* (2013.01); *F01L 3/04* (2013.01);
*F01L 3/08* (2013.01);
(Continued)

(58) Field of Classification Search
CPC ....... F01L 3/14; F01L 3/02; F01L 3/04; F01L 3/08; F01L 2303/00; F01L 3/20;
(Continued)

(56) References Cited

U.S. PATENT DOCUMENTS 1,503,257 A * 7/1924 Parker ................... F01M 9/103
123/90.35
1,731,202 A * 10/1929 Phillips ..................... F01L 3/04
123/188.3
(Continued)

FOREIGN PATENT DOCUMENTS

CN 103032627 A 4/2013
CN 104428500 A 3/2015
(Continued)

OTHER PUBLICATIONS

Boron Carbide Properties NPL, https://www.makeitfrom.com/material-properties/Boron-Carbide-B4C, Feb. 2016 (Year: 2016).*
(Continued)

*Primary Examiner* — Hung Q Nguyen
*Assistant Examiner* — Anthony Donald Taylor, Jr.
(74) *Attorney, Agent, or Firm* — Fishman Stewart PLLC

(57) ABSTRACT

An internal combustion engine may include at least one cylinder and at least one hollow-heat valve. The at least one hollow-head valve may include a valve shaft and a valve head, and may be guided in a valve shaft guide. The engine may also include at least one valve seat ring on which the valve head sealingly lies when the at least one hollow-head valve is closed. The engine may additionally include a valve shaft seal with at least two seal lips and oil disposed between the valve shaft and the valve shaft guide. The at least one valve seat ring may be composed of a sintered metal (Continued)

including infiltrated copper. The valve shaft may include one of a chromium-containing coating and a boron carbide-containing coating.

20 Claims, 2 Drawing Sheets

(51) Int. Cl.
*F01L 3/08* (2006.01)
*F01L 3/02* (2006.01)
*F01L 3/22* (2006.01)
*F01L 3/00* (2006.01)
*F01L 3/20* (2006.01)

(52) U.S. Cl.
CPC . *F01L 3/20* (2013.01); *F01L 3/22* (2013.01); *F01L 2003/25* (2013.01); *F01L 2303/00* (2020.05)

(58) Field of Classification Search
CPC .... F01L 3/22; F01L 2003/25; F02M 21/0266; F02M 63/008; F02M 63/0077
USPC ............... 251/368; 123/41.41, 41.77, 41.34
See application file for complete search history.

(56) References Cited

U.S. PATENT DOCUMENTS

| | | | | | |
|---|---|---|---|---|---|
| 1,938,506 | A | * | 12/1933 | Wellman | F01M 9/105 184/6.9 |
| 1,956,014 | A | * | 4/1934 | Fink | F02B 77/02 123/188.1 |
| 2,411,764 | A | * | 11/1946 | Thoren | B21K 21/16 29/888.45 |
| 2,440,461 | A | * | 4/1948 | Clements | B23K 31/02 29/888.45 |
| 2,471,937 | A | * | 5/1949 | Colwell | B23K 5/006 29/888.451 |
| 2,775,024 | A | * | 12/1956 | Seal | F16C 33/10 428/565 |
| 2,859,993 | A | * | 11/1958 | Estey | F01L 3/08 277/502 |
| 2,878,799 | A | * | 3/1959 | Brenneke | F01L 3/08 123/188.6 |
| 2,906,255 | A | * | 9/1959 | Bunce | F01L 3/08 123/188.6 |
| 2,949,907 | A | * | 8/1960 | Tauschek | F01L 3/14 123/188.1 |
| 3,198,188 | A | * | 8/1965 | Heid, Jr. | F01L 3/08 123/188.6 |
| 3,228,384 | A | * | 1/1966 | Brown | F01L 3/08 123/188.1 |
| 3,498,621 | A | * | 3/1970 | Wilson | F01L 3/08 277/502 |
| 3,554,180 | A | * | 1/1971 | Lesser | F16K 41/04 123/188.6 |
| 3,601,420 | A | * | 8/1971 | Binford | F01L 3/08 277/502 |
| 4,125,265 | A | * | 11/1978 | Grzesiak | F01L 3/08 277/502 |
| 4,198,062 | A | * | 4/1980 | Grzesiak | F01L 3/08 123/188.6 |
| 5,062,397 | A | * | 11/1991 | Larson | F16J 15/32 123/188.6 |
| 5,062,908 | A | * | 11/1991 | Purnell | C22C 33/0242 148/332 |
| 5,271,823 | A | * | 12/1993 | Schachameyer | C25D 3/06 205/224 |
| 5,413,073 | A | * | 5/1995 | Larson | B21D 22/21 123/188.3 |
| 5,441,024 | A | * | 8/1995 | Wietig | F01L 3/04 123/188.3 |
| 5,465,691 | A | * | 11/1995 | Capaldo | F01L 3/08 123/188.9 |
| 5,819,774 | A | * | 10/1998 | Beardsley | F01L 3/08 137/1 |
| 6,139,598 | A | * | 10/2000 | Narasimhan | C22C 38/42 75/246 |
| 6,202,616 | B1 | * | 3/2001 | Gracyalny | F01L 3/08 123/188.5 |
| 6,718,932 | B1 | * | 4/2004 | Cecur | F01L 3/14 123/188.3 |
| 6,901,902 | B1 | * | 6/2005 | Butcher | F16K 41/08 123/188.6 |
| 7,011,067 | B2 | * | 3/2006 | Savel, III | C25D 7/00 123/188.3 |
| 8,881,391 | B2 | * | 11/2014 | Morii | B21C 23/183 29/888.45 |
| 9,284,863 | B2 | | 3/2016 | Kurth et al. | |
| 10,208,636 | B2 | | 2/2019 | Kohler et al. | |
| 2003/0160394 | A1 | * | 8/2003 | Martelli | F01L 3/08 277/500 |
| 2011/0024666 | A1 | * | 2/2011 | London | F01L 3/08 251/366 |
| 2011/0146604 | A1 | * | 6/2011 | Sai | F16F 1/32 123/90.66 |
| 2013/0082203 | A1 | * | 4/2013 | Kurth | F16K 41/04 251/318 |
| 2015/0075489 | A1 | * | 3/2015 | Puetzer | F01L 3/06 123/308 |
| 2015/0322828 | A1 | * | 11/2015 | Kohler | C22C 38/16 277/502 |
| 2017/0183988 | A1 | * | 6/2017 | Katsumata | F01L 3/08 |

FOREIGN PATENT DOCUMENTS

| | | | |
|---|---|---|---|
| DE | 10 2011 107 956 A1 | 1/2013 | |
| DE | 10 2011 083 743 A1 | 4/2013 | |
| DE | 10 2012 013 226 A1 | 1/2014 | |
| DE | 10 2013 213 268 A1 | 1/2015 | |
| EP | 1 002 883 A1 | 5/2000 | |
| EP | 2 112 337 A1 | 10/2009 | |
| EP | 2803827 A1 * | 11/2014 | ............... F01L 3/14 |
| JP | H07 119421 A | 5/1995 | |
| JP | H08 21216 A | 1/1996 | |
| JP | H10 202319 A | 8/1998 | |
| JP | 2012087620 A | 5/2012 | |
| JP | 2012087620 A * | 5/2012 | ............... F01L 3/14 |
| JP | 2016070392 A | 5/2016 | |
| WO | WO-2012/077405 A1 | 6/2012 | |
| WO | WO-2015/00679 A1 | 1/2015 | |
| WO | WO2016198205 A1 * | 12/2016 | ............. C25D 15/00 |

OTHER PUBLICATIONS

Chromium Properties NPL, https://periodictable.com/Elements/024/data.html, Nov. 2016 (Year: 2016).*
English abstract for DE-10 2013 213 268.
English abstract for DE-10 2012 013 226.
English abstract for JP-2016070392.
English abstract for JP-H10 202319.
English abstract for JP-H08 21216.
English abstract for JP-H07 119421.
First Chinese Office Action dated Sep. 27, 2020 for copending Chinese Patent Application No. CN201880004793 (with English translation).
Second Chinese Office Action dated May 7, 2021 for copending Chinese Patent Application No. CN201880004793 (with English translation).

* cited by examiner

INTERNAL COMBUSTION ENGINE WITH AT LEAST ONE HOLLOW-HEAD VALVE

CROSS-REFERENCE TO RELATED APPLICATIONS

This application claims priority to International Patent Application No. PCT/EP2018/051849, filed on Jan. 25, 2018, and German Patent Application No. DE 10 2017 202 585.9, filed on Feb. 17, 2017, the contents of both of which are hereby incorporated by reference in their entirety

TECHNICAL FIELD

The present invention relates to an internal combustion engine with at least one cylinder and with at least two hollow-head valves.

BACKGROUND

Due to increasingly higher required power densities in the field of cylinders of an internal combustion engine, increasingly a so-called temperature management on the valves is important, wherein here in particular heat is to be conveyed away from the valves as quickly as possible and in great measure. Generally for this for example a whole range of individual provisions are already known, such as for example hollow-head valves filled with sodium, which bring about an improved cooling and thereby also an improved heat dissipation in the region of the valve.

The temperature management on valves, i.e. on inlet and outlet valves, forms the limiting factor in present-day internal combustion engines with regard to a further increasing of the power density in the cylinder and thereby also with regard to the further increase of the output of the internal combustion engine.

SUMMARY

The present invention is therefore concerned with the problem of indicating for an internal combustion engine of the generic type an improved or at least an alternative embodiment, which in particular enables a further increase of the power density in the cylinder.

This problem is solved according to the invention by the subject of the independent claim(s). Advantageous embodiments are the subject of the dependent claim(s).

The present invention is based on the general idea of combining several individual provisions with regard to an improved temperature management in a valve of an internal combustion engine and, through several small individual provisions, to achieve a great overall effect with regard to the heat dissipation and thereby with regard to a possible increasing of a power density at a cylinder. The internal combustion engine according to the invention has here at least one cylinder and at least one hollow-head valve, which has a valve shaft and a valve head and is guided in a respectively associated valve guide. Of course, preferably all the valves of the internal combustion engine are embodied in such a manner here. In a closed hollow-head valve, the valve head of the hollow-head valve lies sealingly on an associated valve seat ring. For the improved heat dissipation, provision is now made to provide a valve shaft seal with at least two lips, wherein oil is arranged as heat exchanger medium between the valve shaft and the valve shaft guide. Through the use of the valve shaft seal with at least two seal lips, the oil sealing in the region of the valve shaft guide is optimized, whereby the oil can be held in the region of the valve shaft guide and for an optimum operating point and thereby also makes available a maximum heat transfer from the valve shaft to the valve shaft guide. By the holding of the oil in the intermediate space between the valve shaft guide and the valve shaft, however, not only can the heat transfer and in addition the heat dissipation and the temperature management be improved, but additionally also a wear and harmful deposits on the valve shaft can be reduced.

In an advantageous further development of the invention, the valve shaft guide and/or valve seat ring have a higher thermal conductivity than the valve shaft and the valve head, whereby heat transferred into these components can be dissipated quickly. Through the formation of the valve shaft guide and/or of the valve seat ring from a material with a higher thermal conductivity than the valve shaft or respectively the valve head, an improved heat dissipation and thereby an improved cooling and an improved temperature management can also be achieved in the region of the valve head and of the valve shaft, wherein through the improved cooling of the valve an increase of the power density is made possible in the cylinder, which in turn has a positive effect on the efficiency of the internal combustion engine according to the invention.

In an advantageous further development of the solution according to the invention, the valve shaft guide is made of a sintered metal or a non-ferrous metal, in particular from brass. Brass has, for example, a thermal conductivity λ between 81 and 105 W/mK, which is distinctly higher compared to the thermal conductivity of steel, of which usually the valve head or respectively the valve shaft consists. Steel has a thermal conductivity of approximately 46.5 W/mK. Through such a sintered metal or respectively such a non-ferrous metal, the heat dissipation in the region of the valve shaft guide can be distinctly improved, whereby also here theoretically an increased power density is possible. Through the oil or respectively the oil film arranged between the valve shaft guide and the valve shaft, a heat transfer and thereby a heat dissipation from the valve shaft into the valve shaft guide can take place particularly well.

In an advantageous further development of the internal combustion engine according to the invention, a cavity is produced in the hollow-head valve by drilling and/or by electrochemical machining (ECM). A cavity in the valve shaft can be produced here for example by a simple drilling, while a corresponding cavity in the valve head can be produced for example by means of electrochemical machining, whereby in particular a geometry of the cavity which is adapted to the external geometry of the valve head can be created in the valve head. Hereby, a particularly effective cooling of the valve head is possible.

In an advantageous further development of the solution according to the invention, the cavity in the hollow-head valve is at least partially filled with sodium. Through the at least partial filling of the cavity with sodium, which is liquid during engine operation, an even better heat transport takes place from the valve head, facing the combustion chamber, in the direction of the valve shaft, wherein an internal cooling of the hollow-head valve takes place through the so-called shaker effect, i.e. the shaking to and fro of the liquid sodium for operation in the cavity. Through the improved cooling, in particular also a cooler surface can be achieved in the combustion chamber of the cylinder, whereby for example a shifting of the knocking limit and therefore a favourable selection of the ignition point in the Otto engine combustion design can be achieved. By optimizing these processes, a reduction of the fuel consumption can also be achieved.

According to the invention, the valve seat ring is made of a sintered metal with infiltrated copper. Copper has a particularly high thermal conductivity λ of 380 W/mK and is thereby particularly predestined for an optimized heat dissipation and thereby an optimized cooling of the valve head.

According to the invention, the valve shaft has a chromium-containing or a boron carbide-containing coating. Through such a coating on the valve shaft, an again improved thermal transfer can be achieved, because the base material of the valve shaft, i.e. usually steel, has only a coefficient of thermal conductivity λ of 46.5 W/mK, whereas a chromium-containing coating for example as a thermal conductivity which is almost twice as high. Depending on proportions of alloy elements, a boron carbide-containing coating can also have a thermal conductivity λ of up to 90 W/mK and thereby a distinctly improved thermal conductivity λ than steel. In a further advantageous embodiment of the solution according to the invention, the valve shaft is arranged with play in the valve shaft guide, in particular with a play s of 40 μm<s<80 μm. This concerns a play which is distinctly increased compared to conventional standard valve systems, so that in the intermediate space between the valve shaft and the valve shaft guide more oil and therefore a greater proportion of heat exchanger medium can be put in place. Through the greater shaft play, however, not only can an improved heat transfer be achieved from the valve shaft to the valve shaft guide, but also in addition improved lubricating characteristics can be achieved.

In an advantageous further development, the valve seat ring has an iron-based material with 2-15% Cr, 2-20% Mo, 0.3-5.0% V, 0.3-7.0% W and <20% Co*, with a hardness of 35-60 HRC, and unfiltered Cu, and is in particular produced by sintering at 1100-1200° C.

Further important features and advantages of the invention will emerge from the subclaims, from the drawings and from the associated figure descriptions with the aid of the drawings.

It shall be understood that the features mentioned above and to be explained further below are able to be used not only in the respectively indicated combination, but also in other combinations or in isolation, without departing from the scope of the present invention.

A preferred example embodiment of the invention is illustrated in the drawings and is explained further in the following description.

DETAILED DESCRIPTION

Figure 1:
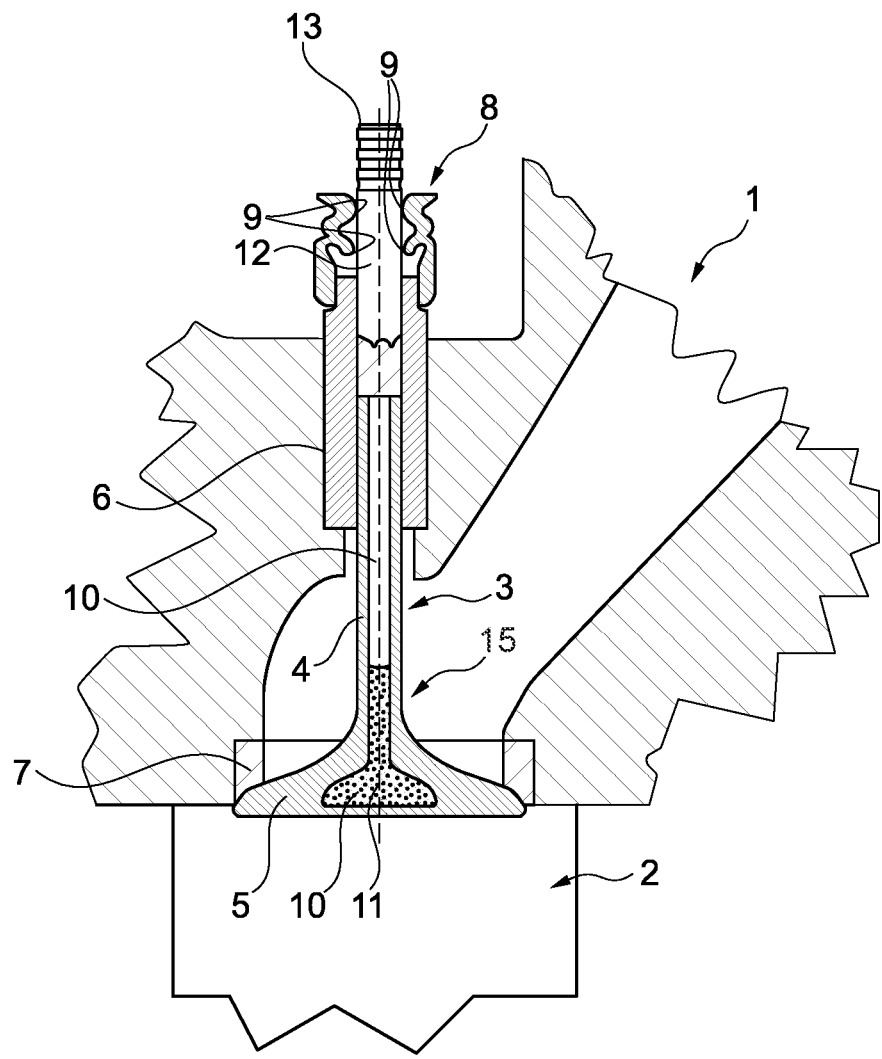
FIG. 1 shows a sectional illustration through an internal combustion engine according to the invention in the region of a valve.

In accordance with FIG. 1, an internal combustion engine 1 according to the invention has at least one cylinder 2 and at least two hollow-head valves 3, of which in the present case respectively only one cylinder 2 and an associated hollow-head valve 3 are drawn, while the second hollow-head valve is arranged above or below the plane of the drawing. The hollow-head valve 3 has here a valve shaft 4 and a valve head 5 and is guided in an associated valve shaft guide 6 (see FIG. 2A). A valve seat ring 7 is also provided, on which the respective valve head 5 sealingly lies when the hollow-head valve 3 is closed, as is shown according to FIG. 1. According to the invention, there is now provided on at least one hollow-head valve 3 a valve shaft seal 8 with at least two seal lips 9 surrounding the valve shaft 4, wherein the valve shaft seal 8 is securely connected with the valve shaft guide 6 and slides along an outer peripheral surface of the valve shaft 4 with its at least two seal lips 9 during operation of the internal combustion engine 1. Oil is arranged here between the valve shaft 4 and the valve shaft guide 6, wherein this oil serves not only for a lubrication, but above all also for a heat dissipation and thereby as a heat exchanger medium between the valve shaft 4 and the valve shaft guide 6.

In an advantageous further development of the invention, additionally now the valve shaft guide 6 and/or the valve seat ring 7 have a higher thermal conductivity λ than the valve shaft 4 and the valve head 5, whereby here also an improved heat transfer and thereby an improved heat dissipation can be achieved.

Usually, the valve shaft 4 and the valve head 5 are made from steel, wherein the hollow-head valve 3 can be configured for example as a constructed hollow-head valve. Depending on proportions of alloy elements, steel usually has a thermal conductivity λ of approximately 46.5 W/mK, whereas the valve shaft guide 6 and the valve seat ring 7 are made from materials which have a distinctly higher thermal conductivity λ. The valve shaft guide 6 can be made for example from a sintered metal or a non-ferrous metal, in particular from brass, wherein brass for example has a thermal conductivity λ of 81 to 105 W/mK and thereby has a distinctly higher thermal conductivity λ than steel. The valve seat ring 7 in turn can likewise be made for example from a sintered metal with infiltrated copper, wherein copper stands out particularly through a high thermal conductivity λ of approximately 380 W/mK and thereby likewise enables an improved heat transfer and an improved thermal dissipation and thereby also an improved cooling of the hollow-head valve 3.

In an advantageous further development, the valve seat ring 7 has an iron-based material with 2-15% Cr, 2-20% Mo, 0.3-5.0% V, 0.3-7.0% W and <20% Co*, with a hardness of 35-60 HRC, and infiltrated Cu and is produced in particular by sintering at 1100-1200° C.

Basically, the valve seat ring 7 can be composed as follows:

| Material with data in % by weight | | | | | | | | |
|---|---|---|---|---|---|---|---|---|
| | C | Cr | Mo | Co | W | V | Cu | Fe Rem. |
| Min. | 0.5 | 5.0 | 5.0 | 15.0 | 1.0 | 0 | 10 | Rem. 0 |
| Max. | 2.0 | 15.0 | 15.0 | 20.0 | 4.0 | 3.0 | 17.0 | Rem. 5.0 |

In particular without Hg, Cd, Pb or hexavalent Cr, use for a multiplicity of fuels, also alcohol and gas.

| Material with data in % by weight | | | | | | | | | |
|---|---|---|---|---|---|---|---|---|---|
| | C | Cr | Mo | Mn | W | V | Cu | Fe | Rem. Si |
| Min. | 1.0 | 10.0 | 2.5 | 0 | 0.8 | 0.4 | 12.0 | Rem. | 0 0.2 |
| Max. | 1.8 | 15.0 | 4.5 | 0.6 | 1.5 | 1.0 | 20.0 | Rem. | 3.0 1.8 |

In particular without Hg, Cd, Pb or hexavalent Cr, high wear resistance, use for a multiplicity of fuels, also alcohol and gas.

| Material with data in % by weight | | | | | | | | | | |
|---|---|---|---|---|---|---|---|---|---|---|
| | C | Cr | Mo | Co | W | V | Cu | Fe | Rem. (Reminder) | Mn |
| Min. | 0.5 | 3.0 | 8.0 | 16.0 | 2.0 | 1.0 | 10.0 | Rem. | 0 | 0 |
| Max. | 2.0 | 6.0 | 15.0 | 22.0 | 5.0 | 3.0 | 17.0 | Rem. | 3.0 | 1.0 |

High wear resistance, high load capacity, use for a multiplicity of fuels, also alcohol and gas.

| Material with data in % by weight | | | | | | | | | |
|---|---|---|---|---|---|---|---|---|---|
| | C | Cr | Mo | Co | W | V | Cu | Fe | Rem. |
| Min. | 0.7 | 2.0 | 12.0 | 8.0 | 2.0 | 1.0 | 10.0 | Rem. | 0 |
| Max. | 1.5 | 4.0 | 18.0 | 12.0 | 4.0 | 2.0 | 20.0 | Rem. | 3.0 |

High wear resistance, high load capacity, use for a multiplicity of fuels, also alcohol and gas.

| Material with data in % by weight | | | | | | | | | |
|---|---|---|---|---|---|---|---|---|---|
| | C | Cr | Mo | Si | W | V | Cu | Fe | Rem. |
| Min. | 0.5 | 2.5 | 5.0 | 0.2 | 3.0 | 1.0 | 10.0 | Rem. | 0 |
| Max. | 1.5 | 5.0 | 8.0 | 1.0 | 6.0 | 4.0 | 20.0 | Rem. | 3.0 |

High wear resistance, use for a multiplicity of fuels, also alcohol and gas.

Material with data in % by weight, with a valve seat ring, consisting of a base material (BM) and a functional material (FM)

| | | C | Cr | Mo | Si | W | V | Cu | Fe | Rem. | Mn | S |
|---|---|---|---|---|---|---|---|---|---|---|---|---|
| BM | Min. | 0.3 | | | | | | 28.0 | Rem. | 0 | 0 | 0 |
| BM | Max. | 1.3 | | | | | | 48.0 | Rem. | 3.0 | 1.0 | 0.5 |
| FM | Min. | 1.0 | 10.0 | 2.5 | 0.2 | 0.8 | 0.4 | 18.0 | Rem. | 0 | 0 | |
| FM | Max. | 1.8 | 15.0 | 4.5 | 1.8 | 1.5 | 1.0 | 28.0 | Rem. | 3.0 | | 0.6 |

In particular without Hg, Cd, Pb or hexavalent Cr, high wear resistance, high load capacity, use for a multiplicity of fuels, also alcohol and gas, base material with high thermal conductivity Material with data in % by weight with a valve seat ring, consisting of a base material (BM) and a functional material (FM)

| | | C | Cr | Mo | Co | W | V | Cu | Fe | Rem. | Mn | S |
|---|---|---|---|---|---|---|---|---|---|---|---|---|
| BM | Min. | 0.5 | | | | | | 5.0 | Rem. | 0 | 0 | 0 |
| BM | Max. | 1.5 | | | | | | 15.0 | Rem. | 3.0 | 1.0 | 0.5 |
| FM | Min. | 1.0 | 2.0 | 12.0 | 8.0 | 2.0 | 1.0 | 10.0 | Rem. | 0 | | |
| FM | Max. | 1.5 | 4.0 | 18.0 | 12.0 | 4.0 | 2.0 | 20.0 | Rem. | 3.0 | | |

In particular without Hg, Cd, Pb or hexavalent Cr, high wear resistance, high load capacity, use for a multiplicity of fuels, also alcohol and gas.

Material with data in % by weight with a valve seat ring, consisting of a base material (BM) and a functional material (FM)

| | | C | Cr | Mo | Si | W | V | Cu | Fe | Rem. | Mn | S |
|---|---|---|---|---|---|---|---|---|---|---|---|---|
| BM | Min. | 0.3 | | | | | | 28.0 | Rem. | 0 | 0 | 0 |
| BM | Max. | 1.3 | | | | | | 48.0 | Rem. | 3.0 | 1.0 | 0.5 |
| FM | Min. | 1.0 | 10.0 | 2.5 | 0.2 | 0.8 | 0.4 | 18.0 | Rem. | 0 | 0 | |
| FM | Max. | 1.8 | 15.0 | 4.5 | 1.8 | 1.5 | 1.0 | 28.0 | Rem. | 3.0 | | 0.6 |

In particular without Hg, Cd, Pb or hexavalent Cr, high wear resistance, use for a multiplicity of fuels, also alcohol and gas, material with high thermal conductivity.

Material with data in % by weight with a valve seat ring, consisting of a base material (BM) and a functional material (FM)

| | | C | Cr | Mo | Si | W | V | Cu | Fe | Rem. | Mn | S |
|---|---|---|---|---|---|---|---|---|---|---|---|---|
| BM | Min. | 0.5 | | | | | | 5.0 | Rem. | 0 | 0 | 0 |
| BM | Max. | 1.5 | | | | | | 15.0 | Rem. | 3.0 | 1.0 | 0.5 |
| FM | Min. | 0.7 | 3.0 | 5.0 | 0.3 | 3.5 | 2.0 | 10.0 | Rem. | 0 | | |
| FM | Max. | 1.4 | 5.0 | 7.5 | 0.9 | 5.5 | 4.0 | 20.0 | Rem. | 3.0 | | |

In particular without Hg, Cd, Pb or hexavalent Cr, high wear resistance, use for a multiplicity of fuels, also alcohol and gas, base material with high thermal conductivity.

The alloys named previously and in the following offer the great advantage that they offer a high wear resistance, a high load capacity and partly a high thermal conductivity and can be used for a multiplicity of fuels, also alcohol and gas.

Material with data in % by weight with a valve seat ring, consisting of a base material (BM) and a functional material (FM)

| | | C | Cr | Mo | Si | W | V | Cu | Fe | Rem. | Mn | S |
|---|---|---|---|---|---|---|---|---|---|---|---|---|
| BM | Min. | 0.5 | | | | | | 5.0 | Rem. | 0 | 0 | 0 |
| BM | Max. | 1.5 | | | | | | 15.0 | Rem. | 3.0 | 1.0 | 0.5 |
| FM | Min. | 0.5 | 3.0 | 8.0 | | 2.0 | 1.0 | 12.0 | Rem. | 0 | 0 | |
| FM | Max. | 2.0 | 6.0 | 15.0 | | 5.0 | 3.0 | 22.0 | Rem. | 3.0 | 1.0 | |

In particular without Hg, Cd, Pb or hexavalent Cr, high wear resistance, high load capacity, use for a multiplicity of fuels, also alcohol and gas, base material with high thermal conductivity.

As can be seen further from FIG. 1, the hollow-head valve 3 has an internal cavity 10, which is formed partly as a bore penetrating the valve shaft 4 and ending in the valve head 5. In the hollow-head valve 3, the cavity 10 is additionally enlarged in the region of the valve head 5 by electrochemical machining and is thereby adapted to the external geometry of the valve head 5. In order to be able to increase the cooling of the hollow-head valve 3, the cavity 10 can be filled at least partly with sodium 11, which becomes liquid during the operation of the engine owing to its low melting point and thereby brings about a cooling of the hollow-head valve 3 by a so-called shaker effect. Through this shaker effect, in particular heat is conveyed away from the cylinder 2 via the valve shaft 4.

Figure 2A:
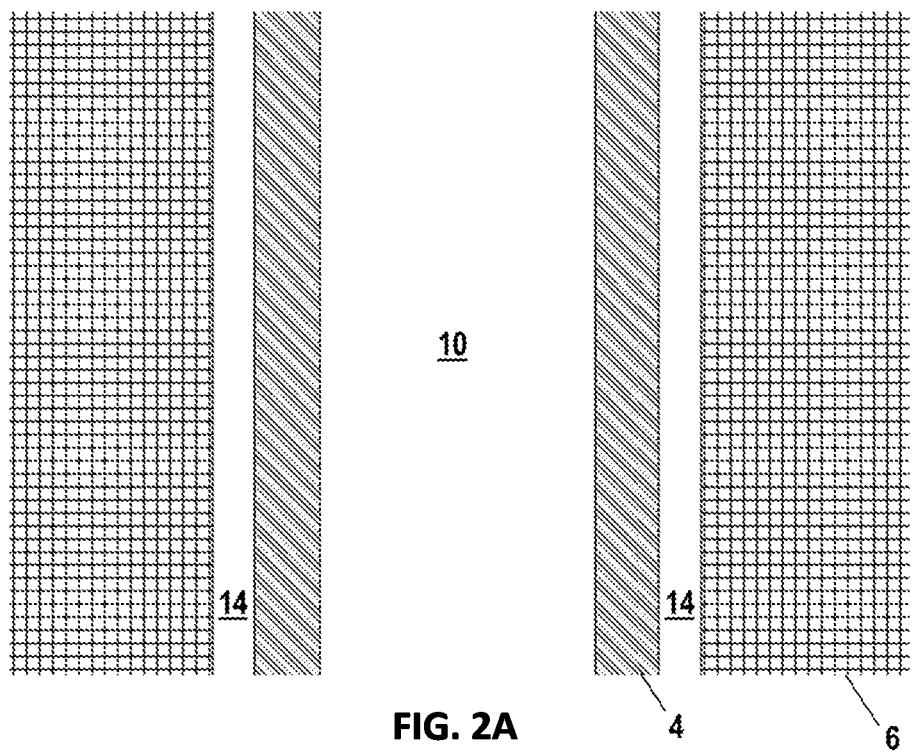
FIG. 2A shows a sectional illustration through the valve and the valve shaft guide of FIG. 1.
Figure 2B:
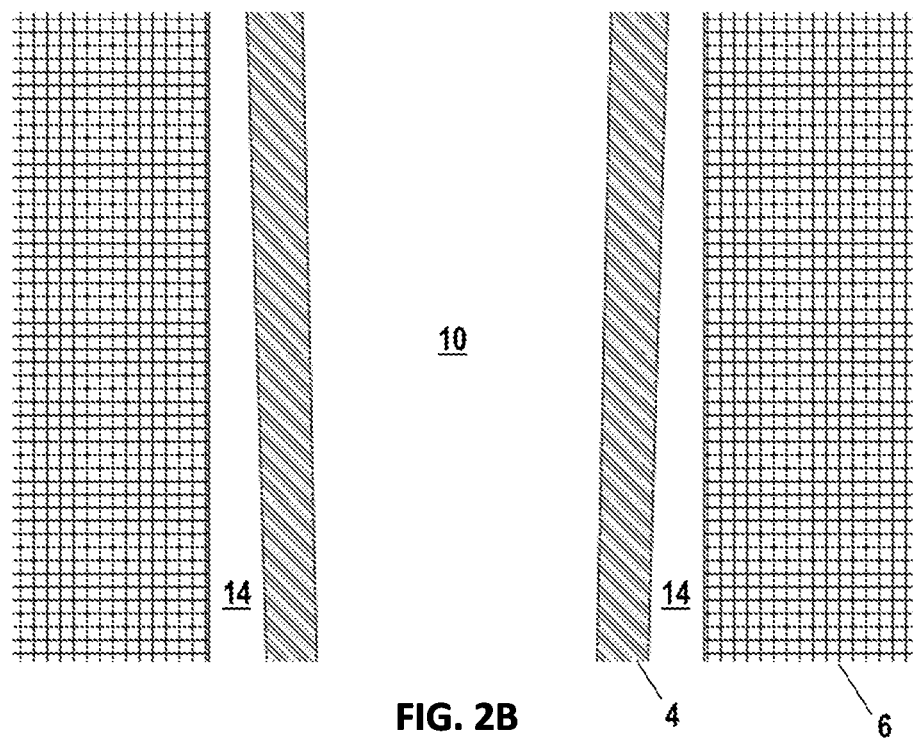
FIG. 2B shows a sectional illustration through a valve shaft guide and a conical valve shaft.

In a particularly preferred embodiment of the internal combustion engine according to the invention, the valve shaft 4 has a chromium-containing or a boron carbide-containing coating 12, which again improves the heat transfer from the base material of the valve shaft 4, which usually consists of steel, into the valve shaft guide 6 via the oil arranged in the intermediate space 14 between the valve shaft 4 and the valve shaft guide 6 (see FIG. 2A, 2B). Through such a coating 12, in addition to an improved heat transfer, additionally also an increased wear resistance can be achieved.

In a further advantageous embodiment of the solution according to the invention, the valve shaft 4 is configured conically and narrows towards the valve head 5 (see FIG. 2B; cf. FIG. 2A), so that in the region of the valve head 5 it has a smaller external diameter than at a free end facing away therefrom. Thus, in particular during operation of the internal combustion engine 1, a diameter difference due to temperature is to be reduced between a valve shaft end 13 and the valve shaft 4 in the region of the valve head 5, and thereby in particular a jamming of the valve shaft 4 in the region of the valve guide 6 is to be prevented. During operation of the internal combustion engine 1, the valve shaft 4 is exposed to distinctly higher temperature loads at the transition 15 to the valve head 5 than at the valve shaft end 13 (see FIG. 1), whereby at the transition 15 to the valve head 5 a greater thermal expansion, due to temperature, takes place. If the diameter of the valve shaft 4 is per se already smaller here, the thermal expansion due to temperature now leads to a diameter which substantially corresponds to the diameter at the free valve shaft end 13, so that during operation of the internal combustion engine 1 a preferably almost cylindrical valve shaft 4 is present.

In a further advantageous embodiment of the solution according to the invention, the valve shaft 4 is arranged with play s in the valve shaft guide 6, in particular with a play s of 40 μm<s<80 μm. Through this comparatively large play, an increased (e.g., annular) intermediate space 14 can be created between the valve shaft 4 on the one hand and the valve shaft guide 6 on the other hand, in which intermediate space 14 more oil and therefore more heat exchanger medium can be arranged, whereby, however, not only an improved heat dissipation and thereby an improved cooling and an improved temperature management can be achieved, but in addition also an improved lubrication of the valve shaft 4 in the valve shaft guide 6 and thereby a smooth bearing of the hollow-head valve 3 in the valve shaft guide 6.

Through the combination of individual temperature management provisions, an in total comparatively great cooling effect can be achieved, which leads to a distinctly improved cooling of the hollow-head valve 3 and thereby to a distinctly improved temperature management, whereby in particular a greater power density can be achieved in the cylinder 2 of the internal combustion engine 1.

The invention claimed is:

1. An internal combustion engine, comprising:
   at least one cylinder;
   at least one hollow-head valve including a valve shaft and a valve head, the at least one hollow-head valve guided in a valve shaft guide;
   at least one valve seat ring on which the valve head sealingly lies when the at least one hollow-head valve is closed;
   a valve shaft seal with at least two seal lips; and
   oil disposed between the valve shaft and the valve shaft guide;
   wherein the at least one valve seat ring is composed of a sintered metal including infiltrated copper;
   wherein the valve shaft includes one of a chromium-containing coating and a boron carbide-containing coating;
   wherein the valve shaft guide is composed of a non-ferrous metal;
   wherein the valve shaft is structured conically and narrows towards the valve head;

wherein the valve shaft has a first end connected to the valve head and a second end disposed opposite the valve head; and wherein a first external diameter of the valve shaft at a transition to the valve head is smaller than a second external diameter of the valve shaft at the second end.

2. The internal combustion engine according to claim 1, wherein at least one of the valve shaft guide and the at least one valve seat ring have a higher thermal conductivity than the valve shaft and the valve head.

3. The internal combustion engine according to claim 1, wherein a cavity is disposed in the at least one hollow-head valve via at least one of drilling and electrochemical machining.

4. The internal combustion engine according to claim 3, wherein the cavity extends from the valve shaft into the valve head.

5. The internal combustion engine according to claim 3, wherein the cavity is at least partially filled with sodium.

6. The internal combustion engine according to claim 1, wherein:
the at least one valve seat ring further comprises an iron-based material with 2-15% Cr, 2-20% Mo, 0.3-5.0% V, 0.3-7.0% W and <20% Co; and
the at least one valve seat ring has a hardness of 35 to 60 HRC.

7. The internal combustion engine according to claim 6, wherein the iron-based material does not include any of mercury, cadmium, lead, and hexavalent chromium.

8. The internal combustion engine according to claim 1, wherein the at least one hollow-head valve includes a cavity having at least one of a drilled portion and an electrochemical machined portion.

9. The internal combustion engine according to claim 1, wherein:
the at least one hollow-head valve includes a cavity having a drilled portion and an electrochemical machined portion;
the drilled portion arranged at least partially within the valve shaft; and
the electrochemical machined portion arranged at least partially within the valve head.

10. The internal combustion engine according to claim 1, wherein the valve shaft is arranged in the valve shaft guide with a radial play of 40 μm to 80 μm.

11. The internal combustion engine according to claim 1, wherein the valve shaft guide is composed of brass.

12. The internal combustion engine according to claim 1, wherein the valve shaft seal is secured to the valve shaft guide and circumferentially surrounds the valve shaft, and wherein the at least two seal lips contact the valve shaft.

13. The internal combustion engine according to claim 1, wherein:
the valve shaft includes the chromium-containing coating; and
a thermal conductivity of the chromium-containing coating is approximately two times larger than a thermal conductivity of the valve shaft.

14. The internal combustion engine according to claim 1, wherein:
the valve shaft includes the boron carbide-containing coating; and
the boron carbide-containing coating has a thermal conductivity of approximately 90 W/mK.

15. An internal combustion engine, comprising:
at least one cylinder;
at least one hollow-head valve including a valve shaft and a valve head;
a valve shaft guide circumferentially surrounding a portion of the valve shaft, the valve shaft guide having a first axial end remote from the valve head and a second axial end proximal to the valve head;
a valve shaft seal including at least two lips, a first portion of the valve shaft seal externally surrounding and secured to the first axial end of the valve shaft guide, and a second portion of the valve shaft seal surrounding and contacting the valve shaft via the at least two lips; and
at least one valve seat ring on which the valve head sealingly lies when the at least one hollow-head valve is closed;
wherein an intermediate space configured to receive and retain oil is defined between the valve shaft and the valve shaft guide such that the valve shaft is arranged in the valve shaft guide with a radial play of 40 μm to 80 μm;
wherein the at least one valve seat ring is composed of a sintered metal including infiltrated copper;
wherein the valve shaft includes one of a chromium-containing coating and a boron carbide-containing coating; and
wherein the valve shaft has a conical shape that narrows towards a transition to the valve head and is configured to thermally expand to have a cylindrical shape during operation of the internal combustion engine.

16. An internal combustion engine, comprising:
at least one cylinder;
at least one hollow-head valve including a valve shaft and a valve head, the valve shaft having a first end connected to the valve head and a second end disposed opposite the valve head;
a valve shaft guide circumferentially surrounding a portion of the valve shaft;
a valve shaft seal including at least two lips; and
at least one valve seat ring on which the valve head sealingly lies when the at least one hollow-head valve is closed;
wherein an intermediate space configured to receive and retain oil is defined between the valve shaft and the valve shaft guide;
wherein the at least one valve seat ring is composed of a sintered metal including infiltrated copper;
wherein the valve shaft includes one of a chromium-containing coating and a boron carbide-containing coating; and
wherein an external diameter of the valve shaft at a transition from the first end of the valve shaft to the valve head is smaller than an external diameter of the valve shaft at the second end.

17. The internal combustion engine according to claim 1, wherein:
a thermal conductivity of the valve shaft guide is greater than a thermal conductivity of the valve shaft and the valve head; and
the thermal conductivity of the valve shaft guide is 81 to 105 W/mK.

18. The internal combustion engine according to claim 1, wherein the valve shaft is configured to thermally expand such that, during operation of the internal combustion engine, the first external diameter of the valve shaft at the transition to the valve head corresponds to the second external diameter of the valve shaft at the second end.

19. The internal combustion engine according to claim 1, wherein the valve shaft is configured to thermally expand from a conical shape to a cylindrical shape during operation of the internal combustion engine.

20. The internal combustion engine according to claim 1, wherein the valve shaft is configured to thermally expand such that, during operation of the internal combustion engine, a difference between the first external diameter of the valve shaft at the transition to the valve head and the second external diameter of the valve shaft at the second end is reduced.

* * * * *